United States Patent [19]

Silvey et al.

[11] Patent Number: 4,462,726
[45] Date of Patent: Jul. 31, 1984

[54] APPARATUS FOR FORMING A GROOVE

[75] Inventors: Fred H. Silvey, Rowland Heights; Jeffrey G. Smith, Velinda, both of Calif.

[73] Assignee: Irontite Products Co., Inc., El Monte, Calif.

[21] Appl. No.: 271,711

[22] Filed: Jun. 8, 1981

[51] Int. Cl.³ .............................................. B23B 39/00
[52] U.S. Cl. ...................................... 408/76; 408/79; 408/85; 409/179; 269/8
[58] Field of Search .............. 409/305, 179, 178, 175; 408/76, 72 R, 85, 98, 204; 269/8, 95

[56] References Cited

U.S. PATENT DOCUMENTS

| | | | |
|---|---|---|---|
| 1,882,689 | 10/1932 | Albertson | 409/178 |
| 2,275,706 | 3/1942 | Wales | 83/140 |
| 2,287,286 | 6/1942 | Bing et al. | 269/8 |
| 2,471,067 | 5/1949 | Hitchcock | 269/8 |
| 2,818,655 | 1/1958 | De Gaston | 408/76 |
| 2,893,551 | 7/1959 | Pirwitz | 269/8 |
| 3,079,191 | 2/1963 | Engelsted et al. | 269/8 |
| 3,331,266 | 7/1967 | Brooks | 409/175 |
| 3,479,743 | 11/1969 | Zemberry | 409/175 |
| 3,664,756 | 5/1972 | Wells | 409/175 |
| 4,234,275 | 11/1980 | Clement | 409/175 |

Primary Examiner—Frank T. Yost
Assistant Examiner—Hien H. Phan
Attorney, Agent, or Firm—Whann & McManigal

[57] ABSTRACT

A support frame having a face which may be positioned against a workpiece. A cutting arm is mounted for rotation relative to the axis of the frame in such a manner as to support a cutting tool which may be used to form a groove in a workpiece, such as a cylinder head. The cutting arm is supported in a rotating unit such that the depth of the tool and the radius of the groove may be precisely controlled. A crank is attached to the turning unit for positive rotation of the cutting tool. A plurality of locating, headed pins are mounted in the frame so that the heads are biased to positions beyond the workpiece-contact face of the frame. In the exemplary use of the tool to form a groove in a cylinder head, the pins may be precisely positioned so as to cooperate with stud bolt holes in the cylinder head in order to precisely locate the axis of the turning unit relative to the cylinder head. The heads of the pins extend into the bolt holes and contact the walls thereof to prohibit movement of the frame about its axis. A pair of rotatable magnets are positioned on the frame in diametric opposition to one another. Each magnet is axially aligned with a pair of hold down inserts so that the elongated poles of the magnets may be aligned relative to the inserts in order to impose a maximum magnetic field between the magnets and the workpiece when the cutting tool is being rotated about the frame axis.

9 Claims, 5 Drawing Figures

APPARATUS FOR FORMING A GROOVE

BACKGROUND OF THE INVENTION

The present invention relates to a tool for forming a groove in a workpiece. More particularly, the invention relates to a tool which may be utilized to form a precisely positioned compression ring seat in a cylinder head such as may be found in certain types of diesel engines.

As is well known, diesel engines utilize the principle of very high compression to generate combustion of the fuel-air mixture within the engine cylinder.

In several series of the engines produced by Mack, in addition to a flat head gasket of the normal type, a lip extends above the engine block about each cylinder in order to force a compression ring to seat in an aligned groove in the cylinder head. Since the compression ring is relatively soft metal, as the cylinder head bolts are tightened, the lip will force the ring to compress into the groove and expand so as to provide a better compression seal than might otherwise be available.

After a normal period of use, the head of a diesel engine must be removed for normal engine repairs. When this is accomplished, the head must be resurfaced, at least partially, in order to get rid of pitting, warpage, etc. Resurfacing of the cylinder head significantly alters the depth of the groove and, in some cases, eliminates the groove altogether. As a result, whenever such work is accomplished, the groove must be reformed or recut in the cylinder head in order to accept a new compression ring when the head is replaced on the engine block.

Tools are currently used for providing or recutting such grooves, but they are very difficult to use, employ an alignment device which is not sufficiently accurate and steadying for the tool to ensure a proper positioning of the groove, and, further, require the use of a plurality of different grooving tools for operating on different engines. For example, one tool must be provided for six-cylinder engines and a different tool for eight-cylinder engines. In either case, it is rather difficult and requires a good deal of skill, to keep the tool properly aligned with the cylinder head in relation to the cylinder openings. If a mistake is made in forming the groove, or if the tool cannot be properly fixed in position while the cutting is being accomplished, the cylinder head may be at least temporarily damaged, resulting in the loss of that engine and the equipment driven by it until the head is again resurfaced and regrooved or a new head is procured.

SUMMARY OF THE INVENTION

This invention relates to a tool which may be quickly and simply placed onto a cylinder head when the latter is removed for reforming the sealing groove which has been damaged or eliminated through servicing.

In the presently preferred embodiment of this invention, a generally circular frame may be provided having a plurality of alignment pins mounted in the frame. Preferably, the alignment pins are so arranged that a pair of pins is provided for an eight-cylinder engine and a different pair of pins is provided for a six-cylinder engine. In practice, this has been found to be necessary since the pins are meant to cooperate with stud bolt holes in the cylinder head and the bolt holes are of a slightly different size in the different series of engines. Thus, in use, it is presently preferred that the alignment-positioning pins which are not being used be removed from the tool. Thus, if an eight-cylinder engine is worked upon, the six-cylinder pins would be removed, and vice versa.

In order to fix the frame to the cylinder head so that it will not tend to ride during the grooving operation and thus cause the groove to be of variable depth, a double pair of hold down inserts may be provided in diametrically opposed positions in the frame. A rotatable permanent magnet may be axially aligned with each pair of hold down inserts in order that, when the opposite magnetic poles (i.e., north and south) are each in contact with both inserts, the magnetic field is "shorted" across the inserts and creates a minimum magnetic effect with the cylinder head. On the other hand, when the permanent magnet is rotated about its vertical axis so that each pole is aligned with only a single one of the pair of inserts, a maximum magnetic field is generated through the cylinder head, thus causing the frame to be fixably held to the cylinder head during the grooving operation.

A rotating unit may be provided in coaxial alignment with the frame for support of a cutting arm thereon. The cutting arm may, in turn, support a tool bit which is properly formed for generation of the groove in the cylinder head.

In the presently preferred embodiment, the cutting arm may be adjustably positioned relative to the rotating unit so as to allow for adjustment of the groove radius, depending on the particular characteristics of the engine being worked upon. Similarly, the rotating unit may be adjustably fixed to the frame so as to allow axial movement of the cutting arm and thereby to adjust the depth of the groove by positioning the cutting tool relative to the face of the cylinder head.

If desired, the cutting arm and the rotating unit may be provided with quick-release detent means therebetween which may be used to position the cutting arm relative to the rotating unit prior to the positive locking thereof one to the other.

Thus summarized, the invention and the multiple objects thereof will be more accurately understood by those skilled in the art upon review of the drawings and the following detailed description. It will be borne in mind, of course, that the drawings and detailed description do not, per se, constitute the invention but, rather, merely relate to the presently preferred embodiment of the invention which is set forth in the claims.

DETAILED DESCRIPTION

Figure 1:
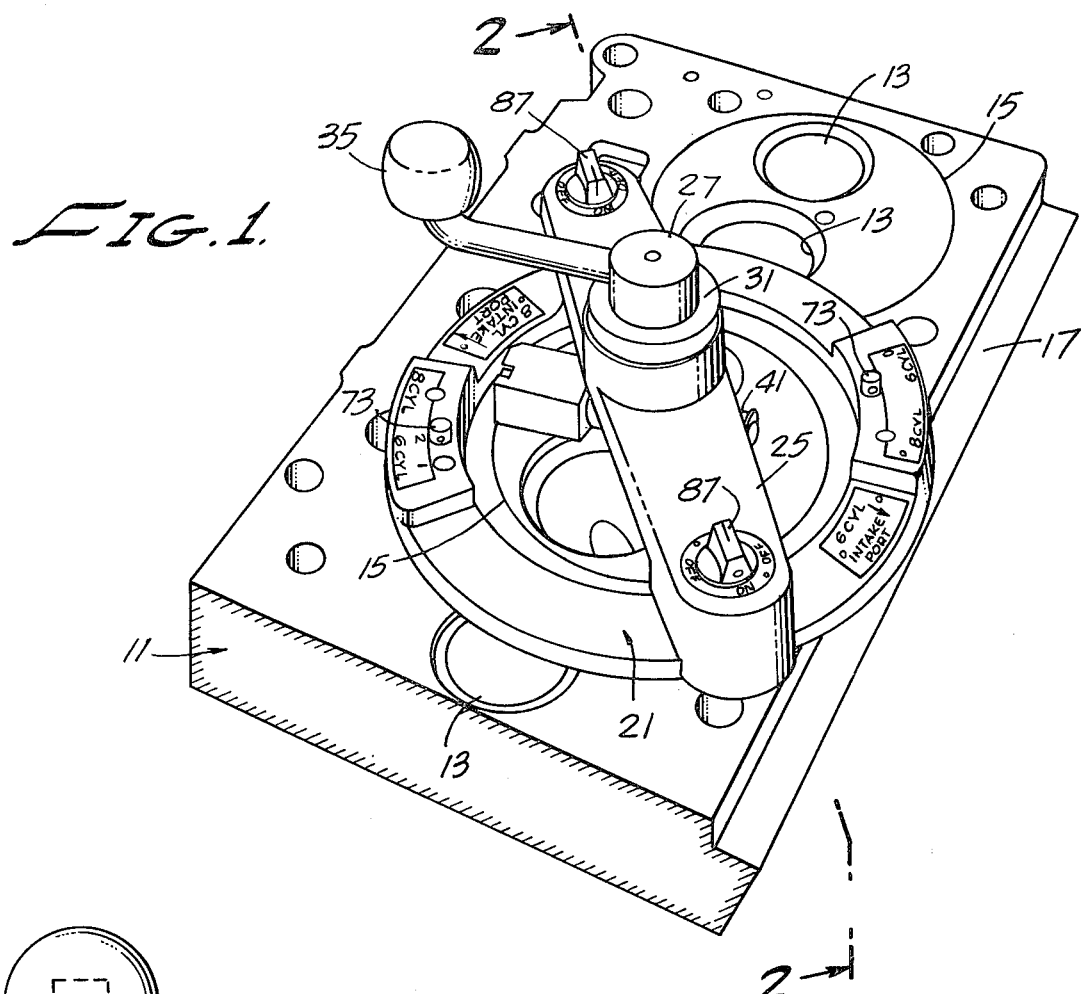
FIG. 1 comprises a perspective illustration of a device formed in accordance with the present invention, depicting its method of use with a cylinder head for forming a groove therein.

Referring now to the drawings in greater detail, there is seen in FIG. 1 an inverted cylinder head 11 having a plurality of upper cylinder ends 13. Around each adjacent pair of valve cylinders, a groove 15 may be provided for the seating of a compression ring therein when the head is fastened to the engine block and a corresponding lip about the block cylinders cooperates with the compression ring to expand it into the groove 15 and generate improved sealing for each of the engine cylinders. Of course, with a diesel engine, such as that manufactured by Mack, this ring-groove combination is the presently preferred embodiment for eliminating the waste of compressed gas from the cylinders, thus robbing the engine of power.

As illustrated, the cylinder head 11 is for a six-cylinder engine and the side 17 of the cylinder head is the intake side.

As illustrated, a generally circular frame 21 may be provided with a workpiece contacting surface 23 which is substantially flat about the entire surface thereof.

Figure 2:
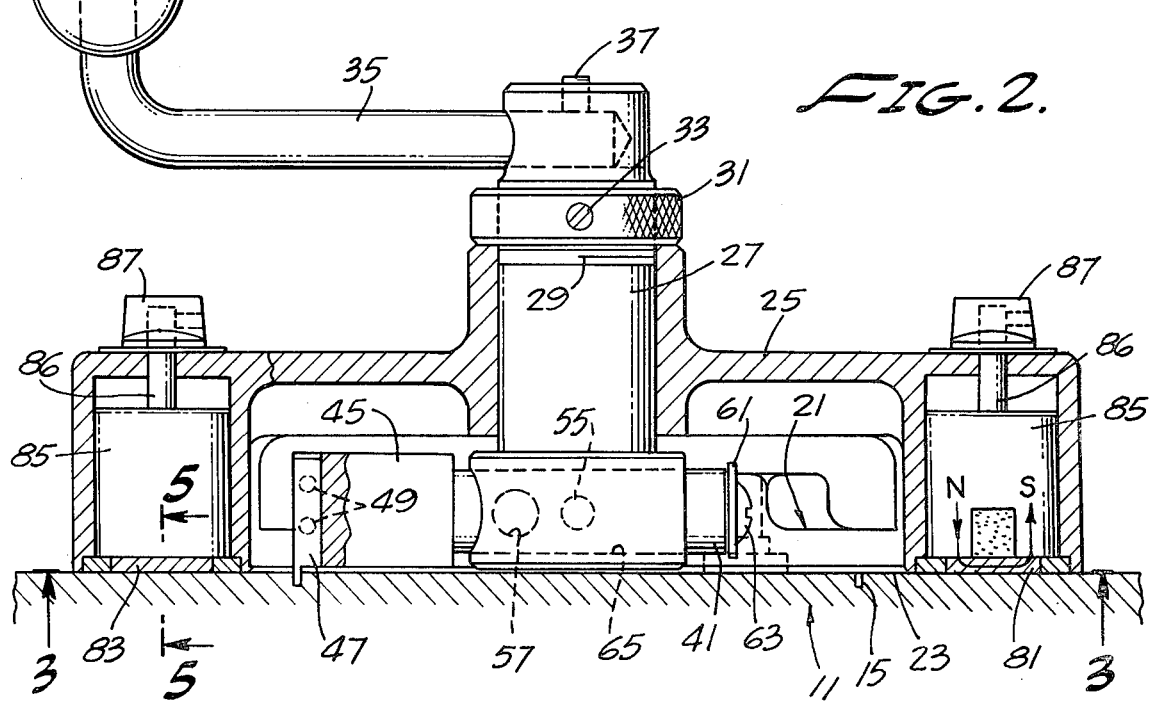
FIG. 2 comprises a cross-sectional configuration of the device shown in FIG. 1, as seen along the line 2—2.
Figure 3:
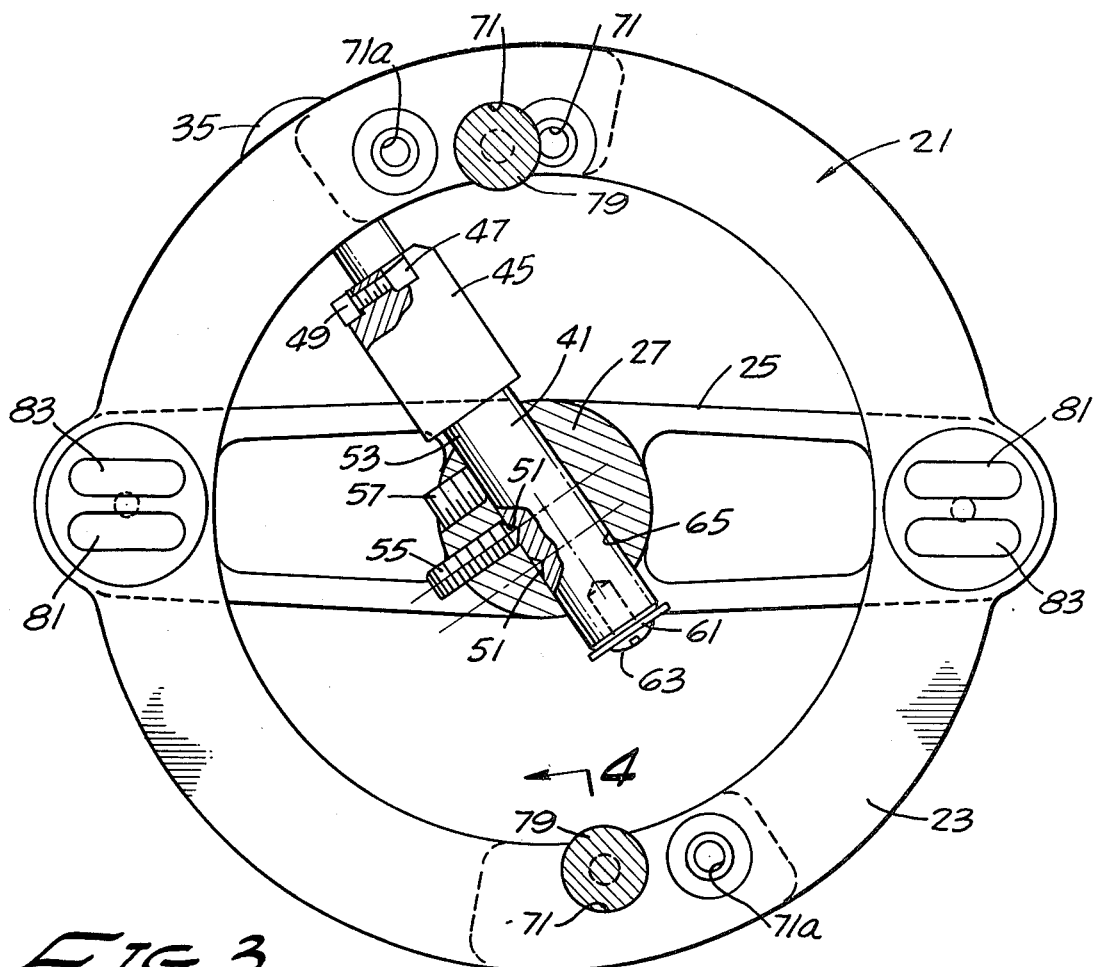
FIG. 3 comprises a bottom plan view of the device shown in FIGS. 1 and 2, as seen along the line 3—3 in FIG. 2.

As particularly illustrated in FIGS. 1-3, a cross member 25 may be formed so as to be integral with the frame and provide a rigid support therewith for a central, coaxially aligned rotating unit 27. The rotating unit 27 may be provided with a threaded portion 29 with which a knurled ring 31 may cooperate for adjustably locating the rotating unit 27 along its axis and the axis of the frame 21.

In use, the ring nut 31 may be turned until the rotating unit 27 is precisely positioned along the axis of the frame and a set screw 33 in the ring nut may then be tightened so that further adjustment cannot inadvertently be made.

At the upper end of the rotating unit 27, a crank handle 35 may be provided for turning the rotating unit and, if desired, the crank handle 35 may be fixed to the rotating unit by any suitable means such as a set screw 37.

As shown particularly in FIGS. 1-3, a cutting arm 41 may be adjustably mounted in the lower end of the rotating unit 27. The cutting arm may comprise a head 45 into which a cutting tool 47 may be mounted and fixedly held therein by any suitable means such as set screws 49. As clearly depicted in FIG. 3, the cutting arm 41 may be provided with a pair of small indentations 51 in a flat surface 53 on the cutter arm 41. The indentations may be used as detents to cooperate with the pointed end of a set screw 55 which will thus prevent inadvertent movement of the cutting arm in such a manner that the radius of the position of the cutting tool 47 could be inadvertently altered. A second set screw 57 may be employed to cooperate with the flat surface 53 of the cutting arm to prevent rotation of the cutting arm about its own longitudinal axis. If desired, a washer 61 and a bolt 63 may be provided to limit movement of the cutting arm 45 through its aperture 65 in the rotating unit.

Thus, as the handle 35 is rotated, the cutting arm 41 will also be rotated so as to draw the cutting tool 47 about the surface of the engine head in order to seat a compression ring therein.

Referring to FIG. 3 particularly, it can be seen that there are two detent indentations 51 in order to positively locate the cutting arm 41 relative to the frame axis. In the position illustrated, the set screw 55 is cooperating with the six-cylinder detent 51 and the eight-cylinder detent 51 is positioned between the six-cylinder detent and the movement limiting washer 61.

Figures 4, 5:
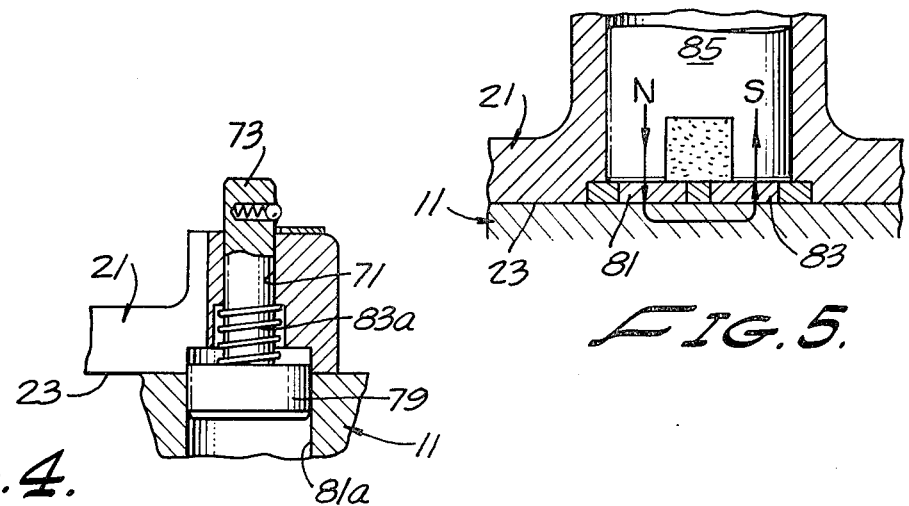
FIG. 4 comprises an enlarged schematic illustration of the use of positioning pins to accurately locate the frame, as seen along the line 4—4 in FIG. 3.
FIG. 5 comprises an enlarged cross-sectional illustration of the frame hold down device, as seen along the line 5—5 in FIG. 2.

Referring now to FIGS. 1, 3 and 4, it can be seen that the workpiece contacting surface 23 of the frame 21 may be provided with a plurality of counter bored apertures 71 for receipt of positioning and locating pins 73. Referring to FIG. 3, it can be seen that the apertures 71a are on a slightly greater radius on the frame than are the apertures 71. Also, it can be seen that there are three apertures 71 and only two apertures 71a. The purpose of this showing is to illustrate that the apertures can be on any radius and, if necessary, even slightly offset from diametric opposition. Thus, for example, the apertures 71a could be employed for eight-cylinder engines and the apertures 71 for six-cylinder engines. Further, the frame may be provided with apertures 71 in various positions in order to accommodate different series of engines or different positions in the same engine. In the presently preferred embodiment, each pin 73 includes an enlarged head 79 which may be installed within a stud bolt hole 81a FIG. 4 in the cylinder head. Further, a spring biasing means 83a may be provided to act against the upper end of the positioning head 79 on the end in order to force the head into the bolt hole 81a. Of course, it will be realized by those skilled in the art that, in certain circumstances, different sizes or shapes of bolt holes must be accommodated by the pins. In such an instance, different pins might be employed or a taper pin might be used with a range of stud bolt hole sizes.

In any event, when the workpiece contacting surface 23 is positioned against the face of the cylinder head, the frame may be moved until the applicable positioning pins 73 (only those necessary for use with a six-cylinder engine being depicted) are located so as to extend into stud bolt holes on the engine head in particular position relative to the cylinders so as to positively locate the frame relative to the cylinders so that the operator can be sure that the groove will be formed in accordance with the precise specifications for cooperation with the lip in the cylinder head.

Referring particularly to FIG. 3, it can be seen that, in the presently preferred embodiment, a double pair of hold down inserts 81, 83 may be provided in diametrically opposed positions on the frame. A cylindrical permanent magnet 85 having both North and South poles may be axially aligned with the hold down inserts (as seen in FIG. 3) and may be provided with any suitable means such as handle 87, for rotating the magnet 85 about its axis.

Comparing the righthand magnet 85 in FIG. 2 with the illustration in FIG. 5 clearly shows that, in one position of the magnet, the opposed north and south poles will "short out" with one another through each of the inserts 81 and 83. However, when the magnet is turned 90°, the north pole will cooperate with one of the inserts and the south pole will cooperate with the other, causing the magnetic field to travel through the workpiece in the manner illustrated by the arrows. Thus, as shown in FIG. 2, the magnetic field will have very little effect on the workpiece, whereas, in FIG. 5, a significant magnetic field will pass through the workpiece, thus causing the frame to be positively fixed to the workpiece for the grooving operation.

In use, the operator will install the cutting tool bit 47 in the cutting arm 45 by causing it to be held in place by means of the set screws 49. The cutting arm will then be installed into the rotating unit, first by tightening the set screw 55 into one of the detent indentations 51, and then by tightening the set screw 57 against the flat surface 53. Of course, it will be realized by those skilled in the art, that different cutting tool bits 47 may be needed for different engines. For example, a different cutting tool bit might be needed for an eight-cylinder engine than is used for a six-cylinder engine.

Next, the rotating unit is pushed up through the frame and the circular nut 31 is turned under the threads 39. To adjust the pitch of the tool bit, the frame can be placed on top of a gauge and the rotating unit brought down until the tool bit bottoms on the gauge. Then, the circular nut 31 can be positioned against the upper end of the boss in the frame through which the rotating unit 27 is mounted and the set screw 33 can be tightened. Finally, the arm 35 can be positioned in the upper end of the rotating unit and the set screw 37 tightened.

At this point, the operator removes the locking pins for whichever size engine the work is not being accomplished (only the six-cylinder pins being shown in place in the drawings) and positions the frame on the cylinder head. The operator may then adjust the position of the frame until the headed ends of pins 73 are pushed down into the related stub bolt holes by the springs 83a.

As the enlarged heads 79 snap into the bolt holes 81a (FIG. 4), the frame will be positively fixed against rotation about its axis. At that time, the operator can rotate the handles 87 which are connected to the magnets 85 by means of shafts 86 in order to position the north and south poles of each magnet in the relationship with the hold down inserts 81, 83 as shown in FIG. 5 for locking magnetically frame 21 to the cylinder head 11.

At this point, the cutting tool bit will be located adjacent to the upper surface of the cylinder head and a slight amount of play in the axial position of the turning unit will be present. As the operator turns the handle 35, he will press down slightly, causing the tool bit to dig into the exposed surface of the cylinder head, thus forming the desired groove, normally within two or three complete revolutions. When the groove is completely cut, the operator need only turn the handles 87 to the unlocked position such that each of the magnets 85 is in a relationship with the hold down inserts 81, 83 as depicted in FIG. 2, and then pick the frame 21 up off the cylinder head and go on to the next position.

Having now reviewed the above detailed description and the accompanying drawings, those skilled in the art will realize that the present invention may be employed in a wide variety of structural embodiments and for a wide variety of uses. None of those embodiments or uses will, however, avoid the scope and spirit of the invention as now set forth in the following claims.

I claim:

1. A device for forming an annular groove in the flat surface of a cylinder head for a six or eight cylinder engine comprising:
   a tool bit having
      a cutting portion thereon;
   a cutting arm including
      means for fixing the tool bit thereto;
   a rotating unit including
      means for fixedly mounting the cutting arm in a selected position relative thereto, and means for selectively locating the cutting arm relative to the rotary unit for selecting the relative positions thereof;
   a frame for rotatably supporting the rotating unit, the frame including
      a flat cylinder head contact surface for supporting the frame on a cylinder head, means for positioning the frame in proper groove-forming position on the cylinder head,
      a pair of rotatable permanent magnet fixing means for releasably holding the frame to the cylinder head,
   means connecting the rotating unit to the frame including
      means for adjusting the axial position of the rotating unit relative to the frame in order to control the cutting depth of the tool bit, and
   each of the pair of rotatable permanent magnet fixing means including
      a permanent magnet having a longitudinal axis and a north pole portion and a south pole portion parallel to said axis, said permanent magnet mounted for rotation in the frame about said axis with the axis and both pole portions being perpendicular to the flat cylinder head contact surface of the frame,
      a pair of hold down inserts in the cylinder head contact surface of the frame, and
      means for selectively aligning directly one of the magnetic pole portions with only a single insert to impose the maximum magnetic field between a cylinder head and the magnetic pole portion and for selectively aligning both of the magnetic pole portions with both inserts to short the magnetic field across the inserts in order to minimize the magnetic attraction between the magnetic pole portions and a cylinder head.

2. The device of claim 1 wherein said means for supporting said frame includes a flat cylinder head contact surface;
   the positioning means comprises
      pin means mounted in the flat cylinder head contact surface of the frame; and
      means biasing the pin means to positions beyond the flat contact surface of the frame.

3. The device of claim 2 wherein
the pin means comprises a plurality of pins dependent upon the number of cylinders in the engine of the cylinder head with which the device is to be employed, and enlarged heads on the ends of the pins for cooperation with stud bolt holes in the cylinder head.

4. A device for forming a groove comprising:
   a pair of hold down inserts located in each of diametrically opposed positions in the frame;
   a permanent magnet having a central axis and North and South magnetic pole portions parallel thereto positioned in the frame with said axis and pole portions perpendicular to the cylinder head contacting portion of the frame and in axial alignment with each pair of hold down inserts;
   means for rotating each cylindrical permanent magnet about said central axis for selective positioning of the parallel North and South magnetic pole portions relative to the hold down inserts so that when the North and South magnetic pole portions are each in contact with both inserts, the magnetic field is shorted across the inserts and creates a minimum magnetic effect with the cylinder head and when the permanent magnet is rotated about its central axis so that each pole portion is aligned with only a single one of the pair of inserts, a maximum magnetic field is effected through the cylinder head;

a frame formed so as to be firmly seated on a cylinder head;

means for accurately positioning the frame relative to the cylinder head for either a six or eight cylinder engine;

two permanent magnet end pole means for releasably fixing the frame to the cylinder head;

means for supporting a cutting tool for rotation relative to a cylinder head contacting portion of the frame;

means for altering the relative position of the cutting tool and the supporting means therefor for controlling the groove-forming position of the cutting tool relative to the cylinder head; and means for adjusting the axial position of the cutting tool supporting means for altering the depth of the cutting tool relative to the cylinder head.

5. A device for cutting a groove in a cylinder head comprising:

a cylindrical frame having a flat workpiece contacting surface mountable on an inverted cylinder head;

a cross member integral with said frame and arranged traversely across said frame;

a pair of permanent magnets each having both North and South pole portions at one end thereof which are parallel to a central axis of rotation, each permanent magnet mounted in an aperture in and traversely of the respective ends of the cross member so that the axis and both pole portions are perpendicular to said flat workpiece contacting surface;

said frame having structure for releasably holding the frame to the cylinder head in conjunction with said North and South pole portions of the pair of permanent magnets comprising a pair of metal inserts in parallel relationship to each other and mounted in the frame directly adjacent the pole end portion of each of the respective permanent magnets and in abutting contact therewith;

means for rotating individually each of said permanent magnets about said central axis through an arc of 90° so that the pole portions thereof will, when opposite magnetic pole portions are each in contact with both inserts, effect flow of the magnetic field across said inserts, thereby creating minimum magnetic field with the cylinder head, and when the permanent magnet is rotated about its central axis so that each pole portion respectively is aligned with only a single one of said pair of inserts, a maximum magnetic field is effected through the cylinder head for fixedly holding said frame to the cylinder head; and means rotatably supported from the center of said cross member for cutting a groove in the cylinder head concentric to the cylinder of the engine block for which said head portion will cover when the head is mounted on the engine block.

6. The device as set forth in claim 5, further including depth adjusting means whereby said means for cutting a groove may be adjusted to cut the concentric groove to the right depth.

7. The device as set forth in claim 6, wherein said means for rotating each of said permanent magnets includes a shaft at the central axis thereof and a handle mounted on each shaft.

8. The device as set forth in claim 7, further including pin means mounted in said frame for locating said frame relative to the cylinder head according to the number and position of stud holes therein, said pin means being provided with biasing means for urging said pin means to a position partly extended out of said frame.

9. The device as set forth in claim 8, wherein said pin means includes a plurality of locating pins, each pin having an enlarged head of approximately stud hole diameter, the cylinder head contacting surface of the frame being provided with a plurality of counter bored apertures for receiving the respective locating pins, and said biasing means includes a spring around each pin for normally biasing same outwardly from the frame.

* * * * *